Dec. 10, 1940.   H. F. VICKERS   2,224,710
VARIABLE SPEED TRANSMISSION
Filed Feb. 9, 1939
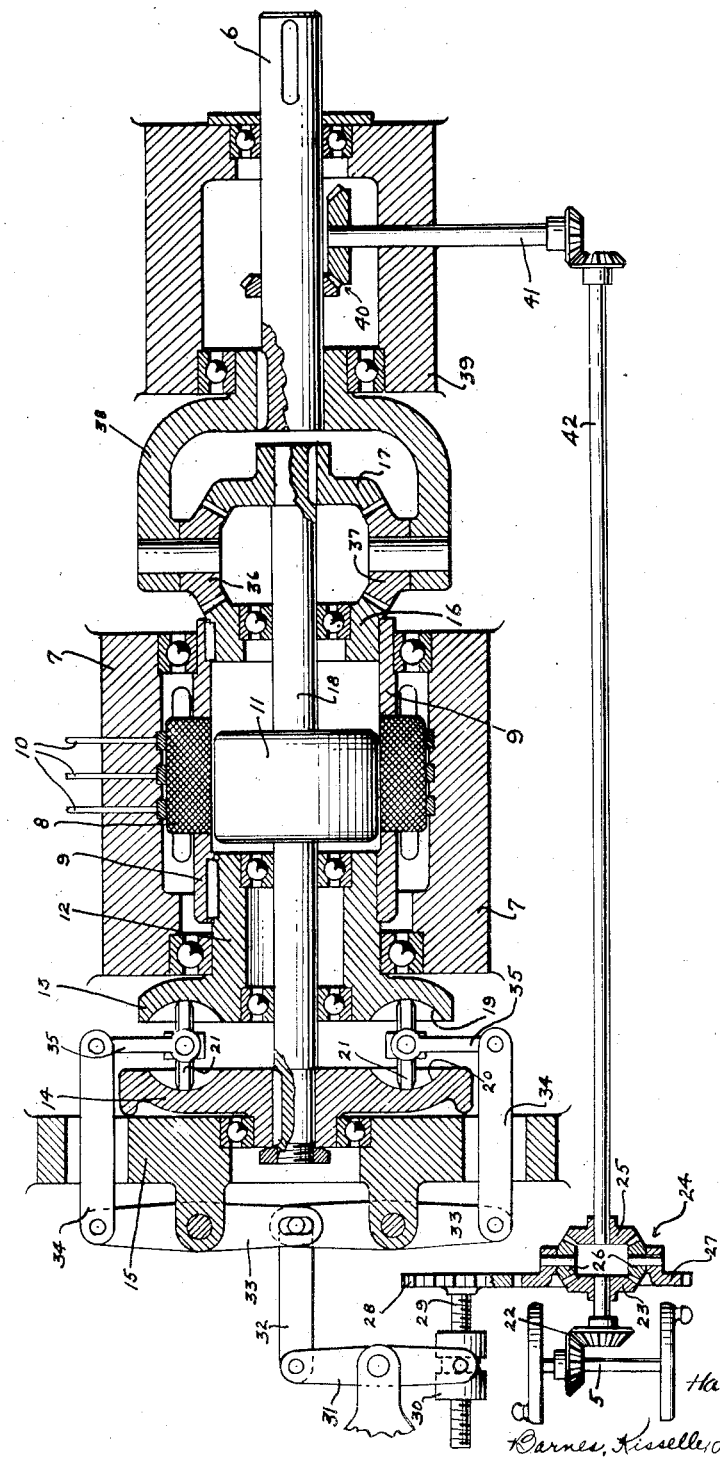
INVENTOR.
*Harry F. Vickers*
*Barnes, Kisselle, Laughlin & Raisch*
ATTORNEYS Patented Dec. 10, 1940

2,224,710

UNITED STATES PATENT OFFICE 2,224,710

VARIABLE SPEED TRANSMISSION

Harry F. Vickers, Detroit, Mich., assignor to Vickers, Incorporated, Detroit, Mich., a corporation of Michigan Application February 9, 1939, Serial No. 255,550

4 Claims. (Cl. 172—239)

This invention relates to a variable speed transmission and has particularly to do with a follow-up mechanism which is motivated by a constant speed electric motor.

It is an object of the present invention to provide a mechanism in which a signal may be given manually and which will relate the signal to a control mechanism which transforms the signal to a power torque on an output shaft.

A further object of the invention is to provide a transmission mechanism which automatically supplies power to the output shaft in direct response to manual rotation and which permits infinite variations in speed from zero to the top speed of the mechanism. A still further object of the invention is to provide a follow-up device in which not only the speed but the direction of the output shaft may be controlled.

Other objects and features of the invention having to do with details in the construction and operation will be brought out in the drawing, description and claims.

In the drawing a partially diagrammatic and largely sectional view of the mechanism is illustrated.

Refering to the drawing, a signal or input shaft to be manually controlled is shown at 5 and a power output shaft is shown at 6.

The power to be furnished to the output shaft is derived from a constant speed electric motor, the housing of which is indicated at 7. A stator or field 8 of the motor is mounted on a sleeve 9, this sleeve being so arranged that it may rotate independently of the motor housing. Power for the motor stator is furnished through lines 10 which are suitably connected with the rotatable stator by proper brushes. The rotor of the constant speed electric motor is shown at 11, the mounting of which will be described hereafter. The left end of the sleeve 9 is keyed to a cylinder 12 which is mounted in bearings in the housing 7. Formed on the end of the cylinder 12 is a disc 13 which is identical, except as hereinafter stated, with a coaxial disc 14 mounted independently in a frame 15. At the right end of the sleeve 9 is keyed a differential gear 16 which is coaxial with a similar gear 17. The rotor 11 is mounted on a shaft 18 which is keyed at one end to a gear 17 and at the other end to the disc 14. The shaft 18 is rotatably mounted with respect to the gear 16 and the sleeve 12 by suitable bearings as shown.

Between the discs 13 and 14 which are provided respectively with annular grooves or races 19 and 20, are tiltably mounted rollers 21. Rotor 11 is slightly offset in relation to stator 8 of the motor in order that the discs 13 and 14 will be drawn together with sufficient force to insure proper frictional contact of the rollers in the grooves. This force will be proportional to the torque and consequently there will be no slippage at high torque and yet no high compression load on the rollers when the torque is low. The mounting of these rollers, as shown, is somewhat diagrammatic but may be accomplished in any suitable manner such that the rollers may be tilted with respect to the axes of the discs 13 and 14. The centers of the rollers must rotate in a plane which lies midway between the discs 13 and 14. The grooves 19 and 20 are substantially semi-circular in cross section. A signal mechanism connects the rollers with the input shaft 5. This mechanism consists of bevel gears 22 which drive a side gear 23 in a differential set up, shown generally at 24. A coaxial side gear, similar to 23 is shown at 25. Planetary gears 26 are located between the side gears 23 and 25 and the spindles upon which gears 26 rotate are fastened in a large gear 27. The gear 27 meshes with a gear 28 upon which is a screw 29. A nut 30 is threaded on the screw 29 so that it will be shifted transversely when the gear 28 is rotated. Transverse shifting of the nut 30 will pivot a lever 31, the movement of which will be transmitted through links 32, 33, 34, and trunnions 35 to the rollers 21.

Gears 16 and 17 form the side gears of differential which is completed by planetary gears 36 and 37 rotatably mounted in a trunnion or spider 38. The output shaft 6 is keyed to the trunnion so that it is coaxial with the shaft 18. The output shaft 6 is mounted in suitable bearings in a housing 39. Driven by the output shaft are bevel gears 40 which impart rotary motion to shafts 41 and 42, the latter shaft being connected to differential side gear 25.

In the operation: Normally the constant speed electric motor will be operating in such a manner that the stator and the rotor will be rotating in opposite directions at equal speeds. These relative speeds are controlled by the discs 13 and 14 between which are the rollers 21. It will be seen that as long as the rollers are in the position shown in the drawing, the discs 13 and 14 must rotate at the same speed in the opposite direction. Movement of the signal shaft 5 will be transmitted through the differential 24 to the nut 30 due to the fact that the gear 25 is temporarily stationary. Shifting of the nut 30 will cause a tilting of the rollers 21 by reason of the linkage connecting the nut and the rollers. When the rollers are tilted, the new position is such that the radii of the peripheral contact points between the rollers and the groove discs will differ. Hence the discs must rotate at different speeds but the sum of the speeds will still be equal to that of the electric motor.

Normally, of course, the differential side gears 16 and 17 are also rotating at equal speeds in opposite directions just as are the discs 13 and 14. However, when the rollers are tilted as described above, the differential gears 16 and 17 will then rotate at different speeds so that the trunnion 38 will be forced to rotate with the planetary gears 36 and 37; thus motion will be imparted to the output shaft 6. The rotation of the shaft 6 will cause movement of the differential gear 25 because of the bevel gears 40 and the shafts 41 and 42. This movement of the bevel gears will tend to compensate for the original movement of the gear 23 so that the rollers 21 will be returned to their original position. If movement of the output shaft is to be continued the hand wheels and input shaft 5 must be further rotated. It will be seen that movement of the output shaft in either direction may be accomplished by the proper signal at shaft 5.

It is important that the masses of the stator 8 and rotor 11 in combination with the respective discs 13 and 14 be balanced against each other in order that smooth changes of speed may be accomplished. Normally the stator 8 of the motor has more mass than the rotor. Since the rotor is secured to the disc 14, this disc is shown provided with additional mass at the rim to balance out that of the stator and disc 13. Consequently as the speed of the stator is imparted to the rotor or vice versa the kinetic energy of one of the revolving masses will, in effect, be transferred to the other.

What I claim is:

1. The combination with an input shaft to be manually controlled and an output shaft to be actuated by a power source, of a means for relating the motion of the input shaft to motion of the output shaft to permit infinitely variable speed, said means comprising a constant speed electric motor having a rotatable stator and a rotor independent thereof, said stator and rotor normally turning at equal speeds in opposite directions, a friction disc device comprising a first disc connected with said stator, a second disc coaxial with and spaced from said first disc and connected with said rotor, one or more rotary members tiltably positioned between said discs, means connecting said input shaft and said rotary members whereby movement of said shaft causes tilting of said rotary members and consequent unequal speeds of said discs, means operably connecting said discs and said output shaft whereby a change in speed between said discs will cause movement of said output shaft, and response means operably connecting said output shaft and said rotary members whereby movement of said output shaft will tend to return said rotary members to a non-tilted position.

2. In a follow-up device, a signal shaft, an output shaft, a constant speed motor comprising a rotor and a stator, each freely rotatable with respect to each other and the mounting means therefor, a control means operably connected with said motor for controlling the relative speeds of said stator and rotor comprising coaxial frictional discs, one connected to the stator and one to the rotor, and friction rollers tiltably mounted between said discs, a signal mechanism connecting said signal shaft and said rollers whereby movement of said signal shaft tilts said rollers, means connected with said output shaft and responsive to changes in the relative speeds of said stator and rotor for imparting motion to said output shaft in response to movement of said signal shaft, and means connected to said signal mechanism and responsive to movement of said output shaft for rendering the signal of said signal shaft ineffective except as it is continuous.

3. In a follow-up device, a signal shaft, an output shaft, a constant speed motor comprising a rotor and a stator, each freely rotatable with respect to each other and to the mounting means therefor, a control means operably connected with said motor for controlling the relative speeds of said stator and rotor comprising coaxial frictional discs, one connected to the stator and one to the rotor, and friction rollers tiltably mounted between said discs, a signal mechanism connecting said signal shaft and said rollers whereby movement of said signal shaft tilts said rollers, and means connected with said output shaft and responsive to changes in the relative speeds of said stator and rotor for imparting motion to said output shaft in response to movement of said signal shaft, said last named means comprising a differential gear system having one of two coaxial gears connected to said stator and the other of said gears connected to said rotor, one or more bevel gears mounted between said coaxial gears and operably connected with said output shaft whereby changes in relative speed between said stator and rotor will be imparted to said output shaft, and means connected to said signal mechanism and responsive to movement of said output shaft for rendering the signal of said signal shaft ineffective except as it is continuous.

4. In a follow-up device, a rotating signal shaft, a rotatable output shaft, a constant speed motor comprising a rotor and a stator each freely rotatable with respect to each other and to the mounting means therefor, a control means operably connected with said motor for controlling the relative speeds of said stator and rotor, a means operably connected with said control means and responsive to movement of said signal shaft for changing the relative speeds of said stator and rotor, means connected with said output shaft and responsive to changes in the relative speeds of said stator and rotor for imparting motion to said output shaft, and response means operatively connecting said output shaft and said signal shaft whereby movement of said output shaft will nullify a signal imparted to said signal shaft except as the signal is continuous.

HARRY F. VICKERS.